United States Patent
Wakahara

(10) Patent No.: US 8,270,117 B2
(45) Date of Patent: Sep. 18, 2012

(54) MAGNETIC HEAD SLIDER LOCKING APPARATUS

(75) Inventor: Masahito Wakahara, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 0 days.

(21) Appl. No.: 13/017,677

(22) Filed: Jan. 31, 2011

(65) Prior Publication Data

US 2011/0205670 A1   Aug. 25, 2011

(30) Foreign Application Priority Data

Feb. 5, 2010   (JP) ................................ 2010-023665

(51) Int. Cl.
 *G11B 5/48* (2006.01)
(52) U.S. Cl. .................. 360/245.3; 360/245.7
(58) Field of Classification Search .................. 360/245, 360/245.2, 245.3, 256.5, 245.7, 234.6
 See application file for complete search history.

(56) References Cited

U.S. PATENT DOCUMENTS

| 6,549,375 | B1 * | 4/2003 | Crane et al. ................. | 360/245.3 |
| 7,016,267 | B2 * | 3/2006 | Suzuki ........................ | 369/13.17 |
| 7,889,460 | B2 * | 2/2011 | Hanya et al. ............... | 360/245.3 |
| 2006/0236527 | A1 * | 10/2006 | Davis et al. ................ | 29/603.12 |
| 2011/0007424 | A1 * | 1/2011 | Wakahara ................... | 360/244.2 |
| 2011/0205670 | A1 * | 8/2011 | Wakahara .................... | 360/256 |
| 2011/0267719 | A1 * | 11/2011 | Wakahara ................... | 360/256.5 |

FOREIGN PATENT DOCUMENTS

| JP | 2007-305209 A | 11/2007 |
| JP | 2009-252261 A | 10/2009 |

\* cited by examiner

*Primary Examiner* — Brian Miller
(74) *Attorney, Agent, or Firm* — Sterne, Kessler, Goldstein & Fox PLLC

(57) ABSTRACT

In the magnetic head slider locking apparatus according to the present invention, a spring portion takes a sandwiching posture in which a center region of a proximal-side engage portion sandwiches a magnetic head slider in a suspension longitudinal direction in cooperation with a distal-side engage portion when an operational force to the spring portion is released after the magnetic head slider has been mounted in a state where the spring portion has been elastically deformed from an initial posture to an elastically deformed posture. Paired arm are elastically deformed by paired side regions of the proximal-side engage portion that are moved upon posture change of the spring portion from the initial posture to the elastically deformed posture so as to take a distant posture in which a distance between the paired arm portions is wider than the width of the magnetic head slider, and are shifted to take a sandwiching posture of sandwiching the magnetic head slider from both sides in the suspension width direction upon posture change of the spring portion from the elastically deformed posture to the sandwiching posture.

15 Claims, 10 Drawing Sheets

MAGNETIC HEAD SLIDER LOCKING APPARATUS

BACKGROUND OF THE INVENTION

1. Field of the Invention

The present invention relates to a magnetic head slider locking apparatus for detachably mounting a magnetic head slider, which reads and/or writes data from and to a recording medium such as a hard disk drive, to a magnetic head suspension.

2. Related Art

It is preferable to conduct performance tests on reading properties and/or writing properties as well as levitation properties of a magnetic head slider for reading and/or writing data in accordance with a state of use of the magnetic head slider, that is, in a state were the magnetic head slider is mounted to a magnetic head suspension having a configuration identical with that of a magnetic head suspension to be mounted thereto.

More specifically, an ordinary magnetic head suspension includes a supporting part that is connected directly or indirectly to an actuator such as a voice coil motor, a load bending part that is connected to the supporting part and generates a load to press a magnetic head slider toward a disk surface, a load beam part that is connected to the load bending part so as to transmit the load to the magnetic head slider, and a flexure part that has a head mount region to which the magnetic head slider is mounted and is supported by the load beam part and the supporting part.

Accordingly, in order to conduct performance tests of the magnetic head suspension in a state corresponding to the used condition thereof, it is necessary to conduct the performance tests in a state where the magnetic head slider is fixed to the head mount region by welding or the like.

However, upon conducting the performance tests in the state where the magnetic head slider is fixed to the head mount region, if the results of the tests on the magnetic head slider are defective, it is necessary to discard not only the magnetic head slider but also the magnetic head suspension to which the magnetic head slider has been fixed, resulting in an increase in cost.

In view of the above, there has been proposed slider support devices for performance tests, which are capable of detachably retaining the magnetic head slider in accordance with a state of use thereof (see, for example, Japanese Unexamined Patent Publication Nos. 2007-305209 and 2009-252261, which are to be hereinafter referred to as prior art documents 1 and 2, respectively).

The slider support device is provided with, in place of the flexure part of the ordinary magnetic head suspension, a flexure part to which the magnetic head slider is detachably mounted.

More specifically, the flexure part has a load beam part overlap region that is connected to the load beam part while being overlapped therewith, paired outriggers (arm regions) that extend toward a distal end side from both ends in a suspension width direction of the load beam part overlap region, a distal-end-side connection region that extends in the suspension width direction so as to connect the distal ends of the paired outriggers, a head mount region that extends from a center in the suspension width direction of the distal-end-side connection region toward a proximal end side in a suspension longitudinal direction, paired right and left spring portions that are provided on both sides in the suspension width direction of the head mount region and extend from the distal-end-side connection region toward the proximal end side in the suspension longitudinal direction, and a proximal-end-side connection region that extends in the suspension width direction so as to connect proximal ends of the paired spring portions.

The distal-end-side connection region is provided with a first support portion that prevents the magnetic head slider mounted on the head mount region from being shifted toward the distal end side in the suspension longitudinal direction.

The paired spring portions are configured to expand and contract independently from each other.

More specifically, one of the paired spring portions is disposed between the distal-end-side connection region and the proximal-end-side connection region on one side of the head mount region in the suspension width direction. On the other hand, the other one of the paired spring portions is disposed between the distal-end-side connection region and the proximal-end-side connection region on the other side of the head mount region in the suspension width direction.

The proximal-end-side connection region is connected to the distal-end-side connection region by way of the paired spring portions so as to be movable in the suspension longitudinal direction relative to the distal-end-side connection region in a state where a center portion in the suspension width direction of an end surface of the distal end thereof serves as a second support portion capable of engaging with an end surface of the proximal end of the magnetic head suspension mounted on the head mount region.

In the slider support device, in a state where the proximal-end-side connection region is shifted to be spaced apart from the distal-end-side connection region so that the paired spring portions are elastically deformed to expand, when the magnetic head slider is mounted on the head mount region and a force applied onto the proximal-end-side connection region is then canceled, the paired spring portions are contracted so that the magnetic head slider is retained between the first and second support portions.

That is, the slider support device is configured to retain the magnetic head slider on the head mount region with use of the elastic forces of the paired spring portions, without adopting substantially inseparable fixing means such as welding or adhesive joining.

The slider support device described above advantageously realizes the performance tests of the magnetic head slider in accordance with the state of use thereof, as well as enables only the defective magnetic head slider to be discarded. On the other hand, this slider support device has the following problems.

Specifically, in each of the slider support devices described in the prior art documents 1 and 2, the magnetic head slider is retained only by the elastic forces of the paired spring portions that act along the suspension longitudinal direction. In result, there is a problem that the magnetic head slider is likely to be displaced in the suspension width direction.

Furthermore, in each of the slider support devices described in the prior art documents 1 and 2, the paired spring portions are disposed respectively on the one side and on the other side of the head mount region, and expand and contract independently from each other.

In other words, each of the paired spring portions has the distal end, which serves as a fixed end, connected to the distal-end-side connection region, and the proximal end, which serves as a movable end connected to the proximal-end-side connection region, so as to be supported in a cantilever manner.

It is necessary to provide each of the paired spring portions with an elastically deformable region that is as large as possible, in order that each of the paired spring portions being supported in a cantilever manner causes a sufficiently strong elastic force in correspondence with the shift of the proximal-end-side connection region so as to be spaced apart from the distal-end-side connection region, while securing a sufficiently large expansion and contraction stroke (a range of elastic deformation).

In view of the above, each of the slider support devices described in the prior art documents 1 and 2 includes the paired spring portions each of which has an accordion shape in a plan view such that convex portions and concave portions are arranged alternately in a plane on which the flexure part is positioned.

The paired spring portions each having such an accordion shape in a plan view secure sufficiently large expansion and contraction strokes thereof as well as increase the elastic forces caused by the paired spring portions. On the other hand, it requires high processing accuracy to form each of the paired spring portions into the accordion shape in a plan view, which results in a remarkable increase in cost.

Moreover, in such a spring portion in the accordion shape in a plan view, the convex portions and the concave portions are locally and elastically deformed upon expansion and contraction of the spring portion in correspondence with the shift of the proximal-end-side connection region to be close to or separate from the distal-end-side connection region. Therefore, the spring portion in the accordion shape in a plan view may also have a problem of durability.

SUMMARY OF THE INVENTION

The present invention has been achieved in view of the problems arising in the conventional art, and a first object thereof is to provide a magnetic head slider locking apparatus that detachably mounts a magnetic head slider to a magnetic head suspension, wherein it is capable of stably locking the magnetic head slider to the magnetic head suspension A second object of the present invention is provide to a magnetic head slider locking apparatus that is capable of generating a sufficiently strong elastic force while the spring portion has a sufficiently large expansion and contraction stroke, as well as is capable of improving durability of the spring portion, with no need for high processing accuracy.

A first aspect of the present invention provides a magnetic head slider locking apparatus for detachably mounting a magnetic head slider to a magnetic head suspension.

The magnetic head suspension includes a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part. The flexure part has a flexure substrate that integrally includes a load beam part overlap region fixed to the load beam part in a state of being overlapped therewith, paired arm regions extending toward a distal end side from both ends in a suspension width direction of the load beam part overlap region, a connection region extending in the suspension width direction so as to connect distal ends of the paired arm regions, and a head mount region which extends from the connection region toward a proximal end side in the suspension longitudinal direction so as to be positioned between the paired arm regions and to which the magnetic head slider is mounted.

The magnetic head slider locking apparatus includes a distal-side engage portion that is fixed directly or indirectly to the flexure substrate so as to be engaged with a distal end of the magnetic head slider, which is mounted directly or indirectly on the head mount region, paired arm portions that are capable of being elastically deformed and are connected directly or indirectly to the distal-side engage portion so as to sandwich the magnetic head suspension, which has been mounted directly or indirectly on the head mount region, from both sides in the suspension width direction, a proximal-side engage portion that is movable in the suspension longitudinal direction in a state capable of engaging with a proximal end of the magnetic head slider being mounted directly or indirectly on the head mount region, and a spring portion that presses the proximal-side engage portion toward the distal-side engage portion.

The proximal-side engage portion includes a center region and paired side regions that extend from the center region toward both sides in the suspension width direction, the center region being capable of engaging with the proximal end of the magnetic head slider that has been mounted directly or indirectly on the head mount region, the paired side regions being capable of engaging with the paired arm portions.

The spring portion takes an initial posture of causing the center region of the proximal-side engage portion to be positioned closer to a distal side in the suspension longitudinal direction than the proximal end of the magnetic head slider, which has been mounted directly or indirectly on the head mount region in a state of being engaged with the distal-side engage portion, in a case of an operational force cancelled state in which no external operational force is applied to the spring portion, an elastically deformed posture of causing the center region to be positioned closer to a proximal side in the suspension longitudinal direction than the proximal end of the magnetic head suspension in a case of an operational force applied state in which an external operational force is applied to the spring portion, and a sandwiching posture of causing the center region to sandwich the magnetic head slider in cooperation with the distal-side engage portion in a case where the external operational force is released after the magnetic head slider has been mounted directly or indirectly on the head mount region while the spring portion being at the elastically deformed posture.

The paired arm portions take a close posture in which a distance between inner surfaces thereof is narrower than a width of the magnetic head slider when the spring portion takes the initial posture, the paired arm portions are engaged with the paired side regions of the proximal-side engage portion that are moved in accordance with a posture change of the spring portion so as to take a distant posture in which the distance between inner surfaces of the paired arm portions is wider than the width of the magnetic head slider when the spring portion is shifted from the initial posture to the elastically deformed posture, and the paired arm portions are disengaged from the paired side regions so as to take a sandwiching posture of sandwiching the magnetic head slider from both sides in the suspension width direction when the spring portion is shifted from the elastically deformed posture to the sandwiching posture.

The magnetic head slider locking apparatus according to the first aspect of the present invention makes it possible to realize stabilized support of the magnetic head slider without worsening workability in mounting or detaching the magnetic head slider.

Preferably, the spring portion is formed into an endless shape so as to surround the distal-side engage portion, the proximal-side engage portion and the paired arm portions in a plan view as viewed along a direction orthogonal to the disk surface. In this case, the magnetic head slider locking apparatus may further include a fixed portion that is positioned within the spring portion in a plan view as viewed along the direction orthogonal to the disk surface and is connected directly or indirectly to the flexure substrate, a distal-side connection portion that connects the fixed portion to the spring portion, and a proximal-side connection portion that connects the proximal-side engage portion to the spring portion. The distal-side engage portion may be connected directly or indirectly to the fixed portion.

Since the spring portion has the endless shape, the preferable configuration makes it possible to secure a sufficiently large expansion and contraction stroke of the spring portion to increase an elastic force generated by an elastic deformation of the spring portion, with no need for forming the spring into a complicated structure.

Accordingly, it is possible to realize a sufficiently strong elastic force for sandwiching the magnetic head slider in the suspension longitudinal direction while achieving reduction in cost.

Furthermore, the preferable configuration makes it possible to improve durability in comparison to the conventional configuration including an accordion-like spring portion that generates an elastic force based on a locally elastic deformation, since the endless spring portion generates the elastic force based on an entirely elastic deformation.

In a preferable configuration, the fixed portion includes a width direction extending region that extends in the suspension width direction and paired longitudinal direction extending regions that are positioned on outer sides of the paired arm portions in the suspension width direction and extend from both ends of the width direction extending region in the suspension width direction toward the distal side in the suspension longitudinal direction. There is provided a base plate fixed to a surface of the head mount region that faces the disk surface. The fixed portion is fixed to the flexure substrate by fixing of the paired longitudinal direction extending region to the surface of the base plate that faces the disk surface.

More preferably, the base plate includes a center region fixed to the head mount region and paired right and left side regions extending from the center region toward both sides of the suspension width direction. There is provided a step between the side regions and the center region so that there is provided a space in a direction orthogonal to the disk surface between the side regions and the flexure substrate in a state where the center region is fixed to the head mount region. The paired longitudinal direction extending regions are fixed to surfaces of the paired side regions that face the disk surface.

A second aspect of the present invention provides a magnetic head slider locking apparatus for detachably mounting a magnetic head slider to a magnetic head suspension.

The magnetic head suspension includes a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part, the flexure part having a flexure substrate that integrally includes a load beam part overlap region fixed to the load beam part in a state of being overlapped therewith, paired arm regions extending toward a distal end side from both ends in a suspension width direction of the load beam part overlap region, a connection region extending in the suspension width direction so as to connect distal ends of the paired arm regions, and a head mount region which extends from the connection region toward a proximal end side in the suspension longitudinal direction so as to be positioned between the paired arm regions and to which the magnetic head slider is mounted.

The magnetic head slider locking apparatus includes a fixed portion that is fixed directly or indirectly to the flexure substrate and has a first longitudinal direction extending region brought into contact with one side of the magnetic head slider, which has been directly or indirectly mounted on the head mount region; a distal-side engage portion that is fixed directly or indirectly to the flexure substrate so as to be engaged with the distal end of the magnetic head slider, which has been directly or indirectly mounted on the head mount region; an arm portion that is connected directly or indirectly to the fixed portion in a state capable of being elastically deformed in the suspension width direction and sandwiches the magnetic head slider in the suspension width direction in cooperation with the first longitudinal direction extending region, the magnetic head slider being directly or indirectly mounted on the head mount region in a state where the side surface thereof on the one side in the suspension width direction is brought into contact with the first longitudinal direction extending region; a proximal-side engage portion that is movable in the suspension longitudinal direction in a state capable of being engaged with the proximal end of the magnetic head slider that has been mounted directly or indirectly on the head mount region; and a spring portion that presses the proximal-side engage portion toward the distal-side engage portion.

The proximal-side engage portion includes a center region and a side region extending from the center region toward the arm portion along the suspension width direction, the center region being engaged with the proximal end of the magnetic head slider that has been directly or indirectly mounted on the head mount region, the side region being engaged with the arm portion.

The spring portion takes an initial posture that causes the center region of the proximal-side engage portion to be positioned closer to a distal side in the suspension longitudinal direction than the proximal end of the magnetic head slider, which has been mounted directly or indirectly on the head mount region in a state of being engaged with the distal-side engage portion, in a case of an operational force cancelled state in which no external operational force is applied to the spring portion, an elastically deformed posture that causes the center region to be positioned closer to a proximal side in the suspension longitudinal direction than the proximal end of the magnetic head suspension in a case of an operational force applied state in which an external operational force is applied to the spring portion, and a sandwiching posture that causes the center region to sandwich the magnetic head slider in cooperation with the distal-side engage portion in a case where the external operational force is released after the magnetic head slider has been mounted directly or indirectly on the head mount region while the spring portion being at the elastically deformed posture.

The arm portion takes a close posture in which a distance away from the first longitudinal direction extending region is narrower than the width of the magnetic head slider when the spring portion takes the initial posture, the arm portion is engaged with the side region of the proximal-side engage portion that is moved in accordance with a posture change of the spring portion so as to take a distant posture in which the distance away from the first longitudinal direction extending region is wider than the width of the magnetic head slider when the spring portion is shifted from the initial posture to the elastically deformed posture, and the arm portion is disengaged from the side region so as to take a sandwiching posture that sandwiches the magnetic head slider in the suspension width direction in cooperation with the first longitudinal direction extending region when the spring portion is shifted from the elastically deformed posture to the sandwiching posture.

The magnetic head slider locking apparatus according to the second aspect of the present invention makes it possible to realize stabilized support of the magnetic head slider without worsening workability in mounting or detaching the magnetic head slider.

In a preferable configuration, the fixed portion includes a width direction extending region that extends in the suspension width direction, the first longitudinal direction extending region extends from one side of the width direction extending region toward the distal side in the suspension longitudinal direction, and the spring portion is formed into an endless shape that is disposed so as to surround the fixed portion, the distal-side engage portion, the proximal-side engage portion and the arm portion in a plan view as viewed along a direction orthogonal to the disk surface. In this case, the magnetic head slider locking apparatus may further include a distal-side connection portion that connects the fixed portion to the spring portion, and a proximal-side connection portion that connects the proximal-side engage portion to the spring portion. The distal-side engage portion is connected directly or indirectly to the fixed portion.

Since the spring portion has the endless shape, the preferable configuration makes it possible to secure a sufficiently large expansion and contraction stroke of the spring portion to increase an elastic force generated by an elastic deformation of the spring portion, with no need for forming the spring into a complicated structure.

Accordingly, it is possible to realize a sufficiently strong elastic force for sandwiching the magnetic head slider in the suspension longitudinal direction while achieving a reduction in cost.

Furthermore, the preferable configuration makes it possible to improve durability in comparison to the conventional configuration including an accordion-like spring portion that generates an elastic force based on a locally elastic deformation, since the endless spring portion generates the elastic force based on an entirely elastic deformation.

In a preferable configuration, the fixed portion may further include a second longitudinal direction extending region that is positioned on an outer side of the arm portion in the suspension width direction and extends from the other side of the width direction extending region toward the distal side in the suspension longitudinal direction. There is provided a base plate fixed to a surface of the head mount region that faces the disk surface. The fixed portion is fixed to the flexure substrate by fixing of the first and second longitudinal direction extending regions to the surface of the base plate that faces the disk surface.

In each of the above various configurations, the distal-side connection portion may be configured to connect the distal side of the fixed portion to the inner peripheral surface of the spring portion at the center in the suspension width direction, and the proximal-side connection portion may be configured to connect the center region of the proximal-side engage portion to the inner peripheral surface of the spring portion at the center in the suspension width direction.

The configuration makes it possible to increase as much as possible the length of the region in which the spring portion is elastically deformed, thereby effectively preventing concentration of a stress onto a specific region of the spring portion upon elastic deformation of the spring portion.

More preferably, an engagement surface of the center region that is engaged with the magnetic head slider may have a curved shape that is convex toward the distal side in the suspension longitudinal direction in a plan view.

The configuration makes it possible to preferably maintain the engagement between the center region of the proximal-side engage portion and the magnetic head slide', even in a case where the magnetic head slider is displaced with respect to the center region of the proximal-side engage portion.

In the configuration where the spring portion has the endless shape, the spring portion may have a substantially elliptical shape when being in the initial posture, the elliptical shape having the length in the suspension width direction larger than the length in the suspension longitudinal direction, the longitudinal length being increased while the width length is reduced as the spring portion is transformed from the initial posture into the elastically deformed posture.

The configuration makes it possible that whole of the spring portion is elastically deformed without difficulty between the initial posture and the elastically deformed posture. Accordingly, it is possible to effectively prevent concentration of a stress onto a specific region of the spring portion upon elastic deformation of the spring portion to enhance durability of the spring portion.

In a more preferably configuration, the substantially elliptical shape is formed by a distal-side linear section, a proximal-side linear section, a first curved section and a second curved section, the distal-side linear section extending from a site to which the distal-side connection portion is connected toward both sides in the suspension width direction, the proximal-side linear section extending from a site to which the proximal-side engage portion is connected toward both sides in the suspension width direction, the first curved section connecting first ends of the distal-side linear section and the proximal-side linear section and being formed into a convex shape toward the outer side in the suspension width direction in a plan view, the second curved section connecting second ends of the distal-side linear section and the proximal-side linear section and being formed into a convex shape toward the outer side in the suspension width direction in a plan view.

The configuration makes it possible to effectively prevent contact of the spring portion to the fixed portion when the spring portion is elastically deformed, without increasing the size of the spring portion.

BRIEF DESCRIPTION OF THE DRAWINGS

FIGS. 5A to 5C show an initial posture, an elastically deformed posture and a sandwiching posture of the spring portion of the magnetic head slider locking apparatus, respectively.

DETAILED DESCRIPTION OF THE PREFERRED EMBODIMENTS

First Embodiment

Hereinafter, one preened embodiment of a magnetic head slider locking apparatus according to the present invention will be described, with reference to the attached drawings.

Figure 1:
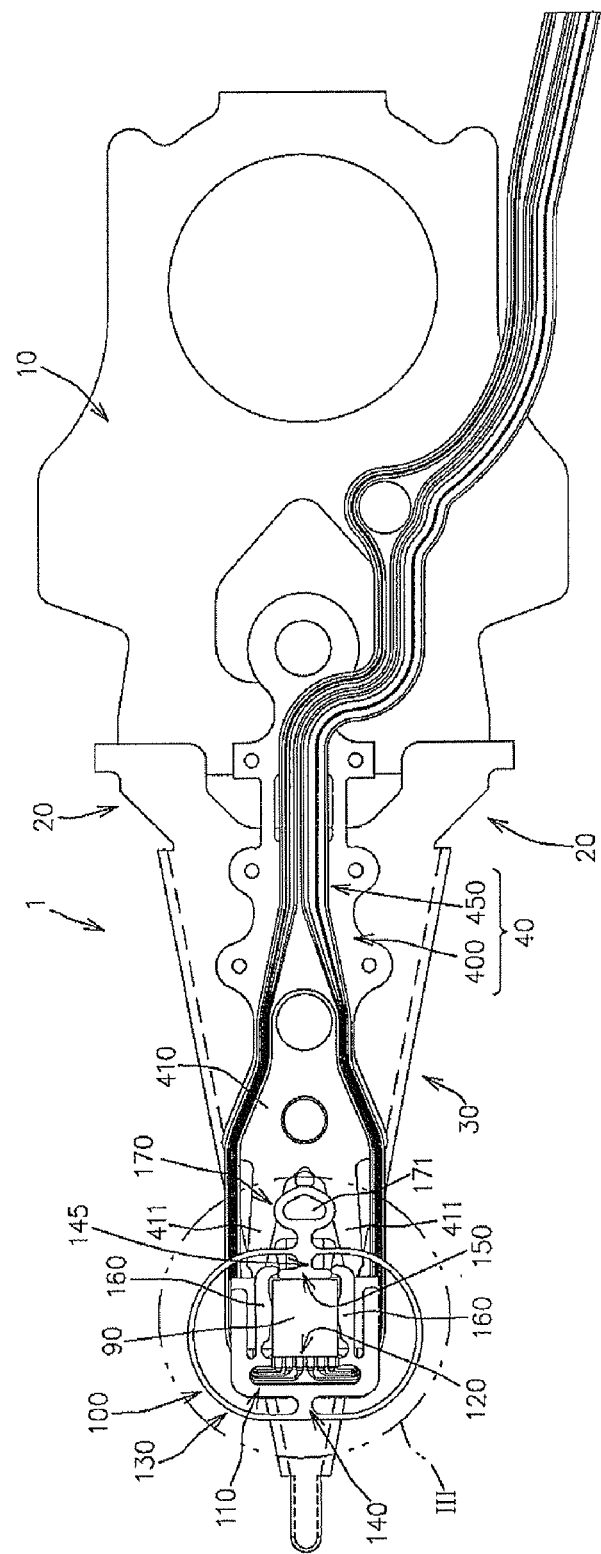
FIG. 1 is a bottom view of a magnetic head suspension with a magnetic head slider being mounted thereto with use of a magnetic head slider locking apparatus according to a first embodiment of the present invention.

FIG. 1 is a bottom view (a bottom plan view as viewed from a side close to a disk surface) of a magnetic head suspension 1 to which a magnetic head slider locking apparatus 100 according to the present embodiment is mounted. FIG. 1 indicates welding points with small circles.

Figure 2:
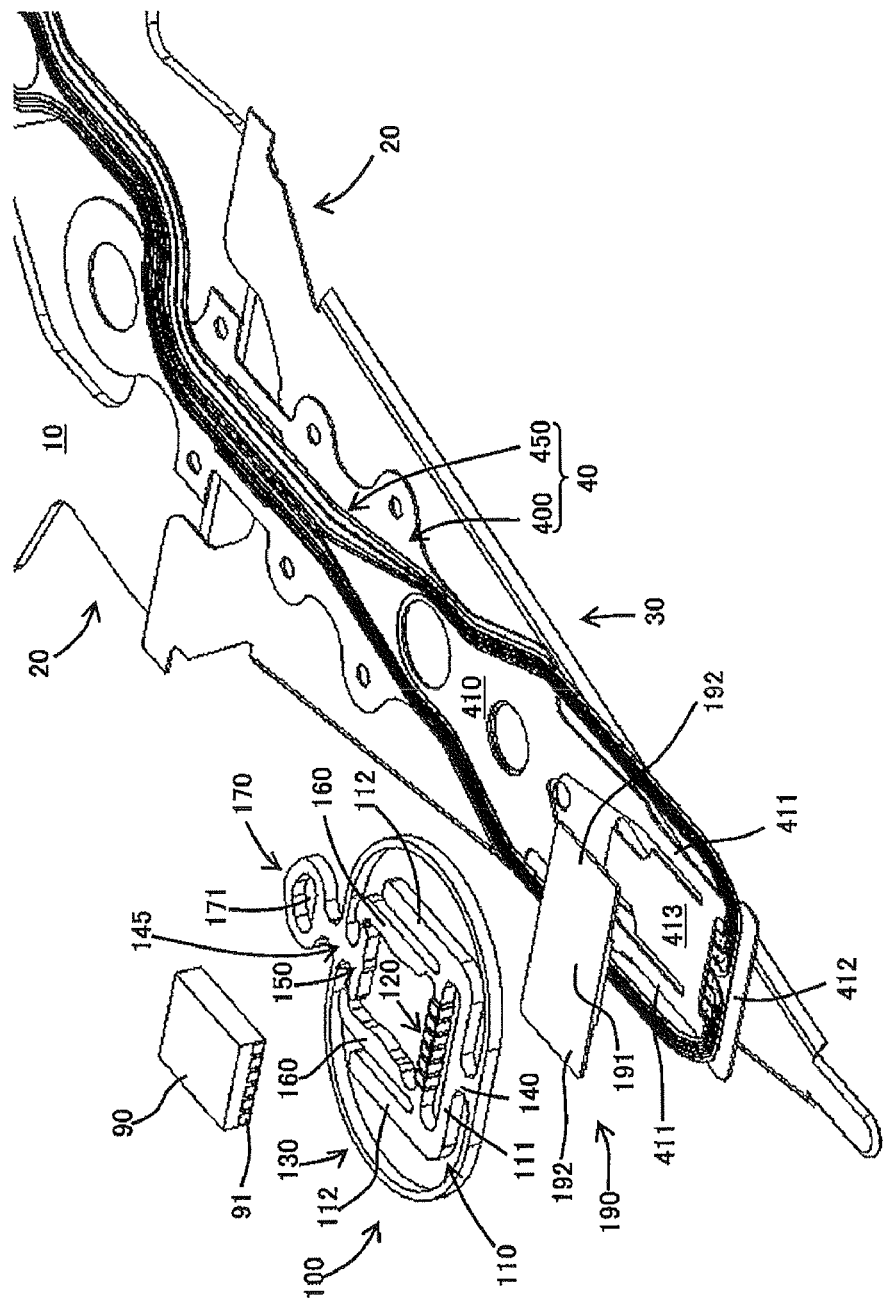
FIG. 2 is an exploded perspective view of the magnetic head suspension shown in FIG. 1.

FIG. 2 is an exploded perspective view of a magnetic head slider 90, the magnetic head slider locking apparatus 100 and the magnetic head suspension 1, as viewed from the side close to the disk surface.

The magnetic head slider locking apparatus 100 is a member for detachably mounting the magnetic head slider 90 to the magnetic head suspension 1.

More specifically, the magnetic head slider locking apparatus 100 is capable of causing the magnetic head slider 90 to be retained at the magnetic head suspension 1 so as to allow performance tests of the magnetic head slider 90 regarding reading properties and/or writing properties as well as levitation properties thereof to be conducted under a used condition where the magnetic head slider 90 is actually mounted to the magnetic head suspension 1, and is also capable of easily detaching the magnetic head slider 90 from the magnetic head suspension 1 when the magnetic head slider 90 is defective.

The magnetic head suspension 1 to which the magnetic head slider locking apparatus 100 is applied is firstly explained.

As shown in FIGS. 1 and 2, the magnetic head suspension 1 includes a supporting part 10 that is swung about a swing center directly or indirectly by an actuator such as a voice coil motor, a load bending part 20 that generates a load for pressing the magnetic head slider 90 toward the disk surface, a load beam part 30 that is supported by the supporting part 10 through the load bending part 20 and transmits the load to the magnetic head slider 50, and a flexure part 40 that is supported by the load beam part 30.

In the illustrated embodiment, the supporting part 10 is formed as a base plate including a boss portion to which a distal end of a carriage arm (not shown) is joined by swage processing, the carriage arm being connected to the actuator. However, it is of course possible that the supporting part 10 is formed as an arm that is directly connected to the swing center of the actuator.

As shown in FIGS. 1 and 2, the flexure part 40 includes a flexure substrate 400 fixed to the load beam part 30 and the supporting part 10, and a wiring structure 450 laminated on the flexure substrate 400.

The flexure substrate 400 includes a load beam part overlap region 410 fixed to the load beam part 30 by welding or the like in a state of being overlapped with the load beam part 30, paired arm regions 411 that extend toward a distal end side from both ends in a suspension width direction of the load beam part overlap region 410, a connection region 412 that extends in the suspension width direction so as to connect distal ends of the paired arm regions 411, and a head mount region 413 which extends from the connection region 412 toward a proximal end side in the suspension longitudinal direction so as to be positioned between the paired arm regions 411 and to which the magnetic head slider 90 is mounted.

The magnetic head slider locking apparatus 100 is capable of detachably mounting the magnetic head slider 90 on the head mount region 413.

Figure 3:
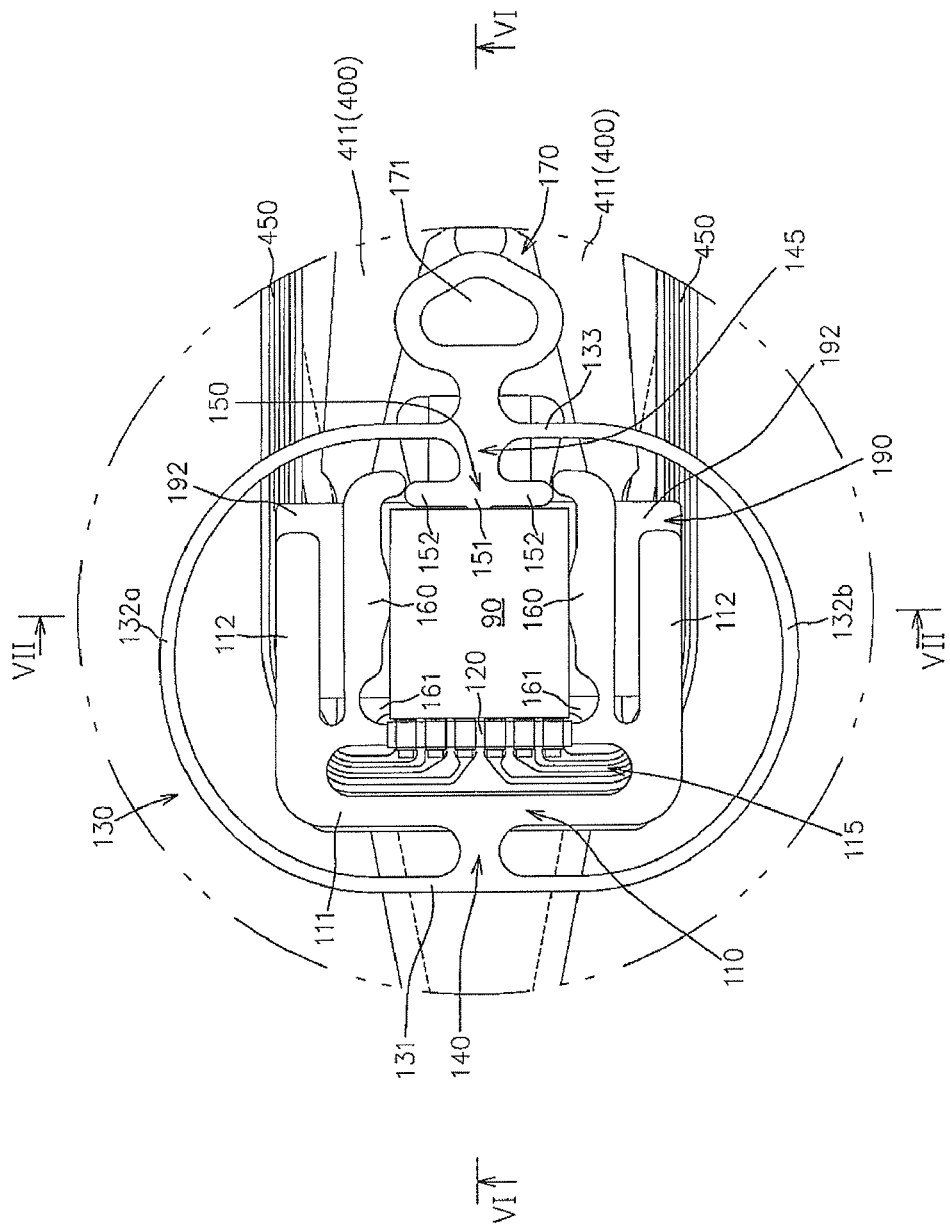
FIG. 3 is an enlarged view of III portion in FIG. 1.

FIG. 3 is an enlarged view of III portion in FIG. 1.

Figure 4:
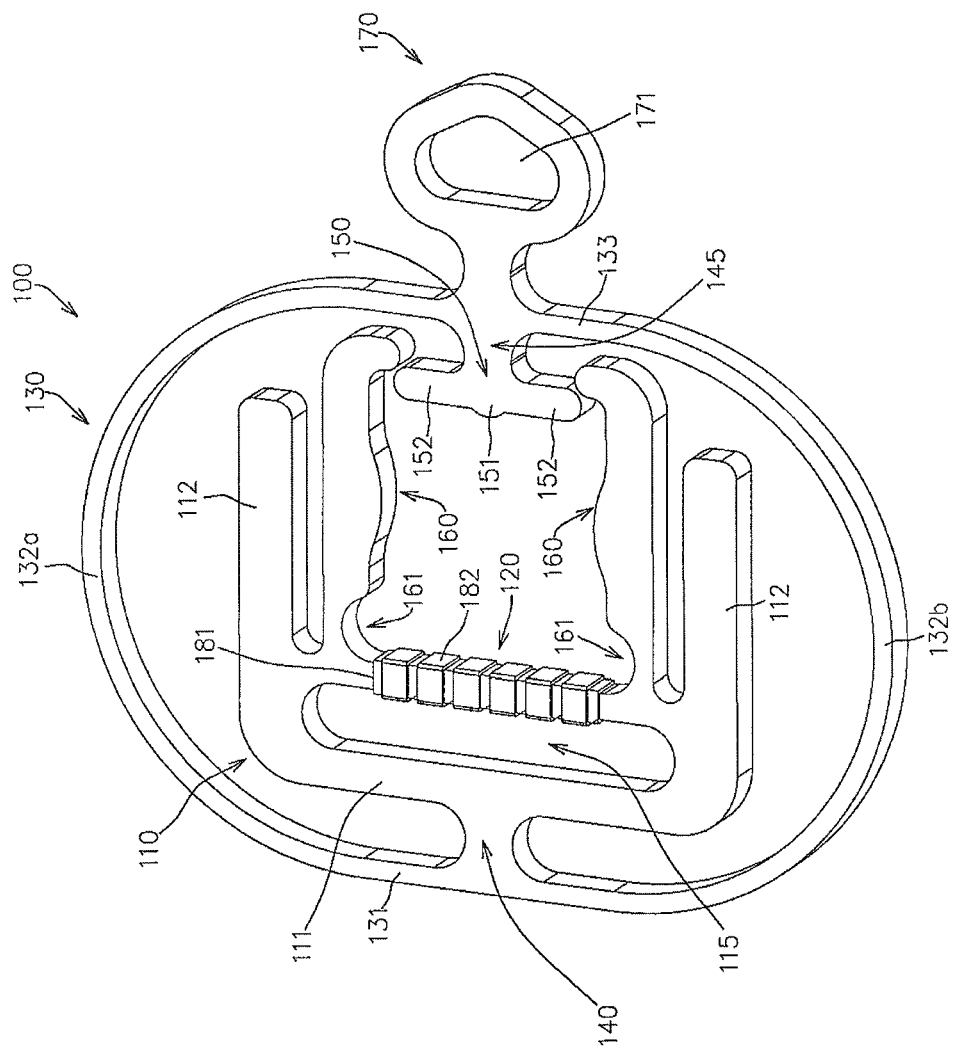
FIG. 4 is a perspective view of the magnetic head slider locking apparatus according to the first embodiment.

FIG. 4 is a perspective view of the magnetic head slider locking apparatus 100.

As shown in FIGS. 3 and 4 or the like, the magnetic head slider locking apparatus 100 includes a distal-side engage portion 120 that is directly or indirectly fixed to the flexure substrate 400 so as to be engaged with a distal end of the magnetic head slider 90 being directly or indirectly mounted on the head mount region 413, paired arm portion 160 directly or indirectly connected to the distal-side engage portion 120 in a state capable of being elastically deformed so as to sandwich the magnetic head slider 90 from both sides thereof in the suspension width direction, the magnetic head slider 90 being directly or indirectly mounted on the head mount region 413, a proximal-side engage portion 150 capable of being moved in the suspension longitudinal direction in a state capable of being engaged with a proximal end of the magnetic head slider 90 that is directly or indirectly mounted on the head mount region 413, and a spring portion 130 that presses the proximal-side engage portion 150 toward the distal-side engage portion 120.

As shown in FIGS. 3 and 4, the proximal-side engage portion 150 includes a center region 151 and paired side regions 152 that extend from the center region 151 toward both sides in the suspension width direction. The center region 151 is capable of engaging with the proximal end of the magnetic head slider 90 being directly or indirectly mounted on the head mount region 413. The paired side regions 152 are capable of engaging with the paired arm portions 160.

Figure 5A:
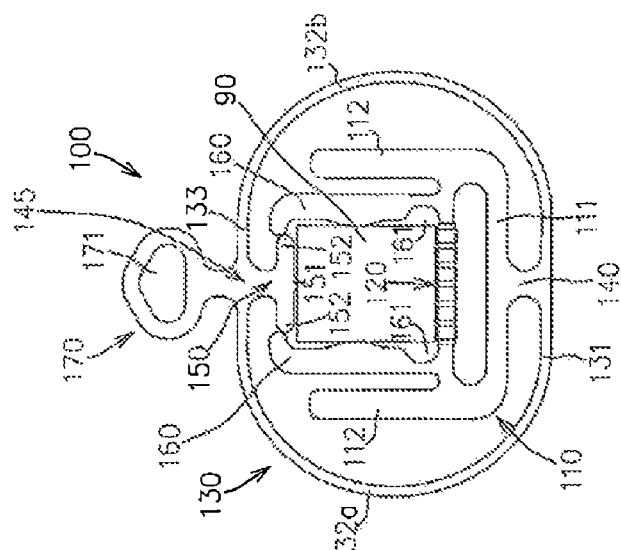
FIGS. 5A to 5C are plan views of the magnetic head slider locking apparatus according to the first embodiment.
Figure 5B:
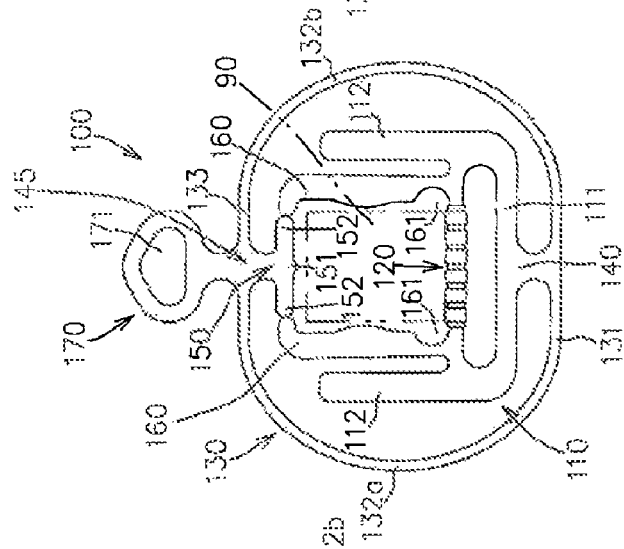
Figure 5C:
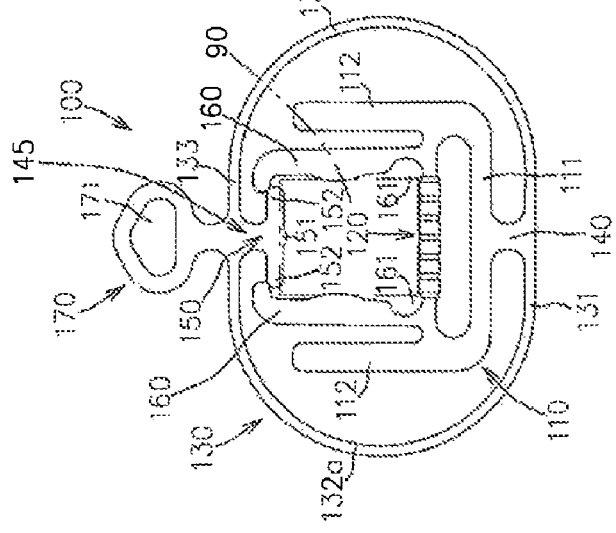

FIGS. 5A to 5C show an initial posture, an elastically deformed posture and a sandwiching posture of the spring portion 130, respectively. The spring portion 130 takes the initial posture when no external operational force is applied thereto. The spring portion 130 takes the elastically deformed posture when an external operational force is applied to the spring portion 130 so that the center region 151 of the proximal-side engage portion 150 is spaced apart from the distal-side engage portion 120 while elastically deforming the spring portion 130. The spring portion 130 takes the sandwiching posture when the magnetic head slider 90 is located between the distal-side engage portion 120 and the center region 151 of the proximal-side engage portion 150 in a state where the spring portion 130 has been in the elastically deformed posture, and then the external operational force is canceled.

When the spring portion 130 is in the initial posture, the center region 151 of the proximal-side engage portion 150 is located on the distal side in the suspension longitudinal direction farther than the proximal end of the magnetic head slider 90 that is directly or indirectly mounted on the head mount region 413 in a state of being engaged with the distal-side engage portion 120, as shown in FIG. 5A.

When the spring portion 130 is in the elastically deformed posture, the center region 151 of the proximal-side engage portion 150 is located on the proximal side in the suspension longitudinal direction farther than the proximal end of the magnetic head slider 90, as shown in FIG. 5B.

Therefore, in a case where the magnetic head slider 90 is located between the distal-side engage portion 120 and the proximal-side engage portion 150 with the spring portion 130 being in the elastically deformed posture and then the external operational force is canceled, the spring portion 130 tries to return from the elastically deformed posture to the initial posture to take the sandwiching posture in which the magnetic head slider 90 is retained by the center region 151 of the proximal-side engage portion 150 in cooperation with the distal-side engage portion 120, shown in FIG. 5C.

Furthermore, the magnetic head slider locking apparatus 100 according to the present embodiment is configured so that the paired arm portions 160 take postures that are changed in response to the change of the postures of the spring portion 130.

More specifically, the paired arm portions 160 selectively take a close posture, a distant posture or a sandwiching posture. When the spring portion 130 takes the initial posture, the paired arm portions 160 take the close posture in which a distance between inner surfaces of the paired arm portions 160 is narrower than a width of the magnetic head slider 90 (see FIG. 5A). When the spring portion 130 is shifted from the initial posture to the elastically deformed posture, the arm portions 160 are engaged with the paired side regions 152 that are moved in accordance with the change of the posture of the spring portion 130 to take the distant posture in which the distance between inner surfaces of the paired arm portions 160 is wider than the width of the magnetic head slider 90 (see FIG. 5B). When the spring portion 130 is shifted from the elastically deformed posture to the sandwiching posture, the arm portions 160 are disengaged from the paired side regions 152 so as to take the sandwiching posture of sandwiching the magnetic head slider 90 from both sides in the suspension width direction (as shown in FIG. 5C).

The magnetic head slider locking apparatus 100 configured as described above exerts the following effects.

As referred to in the explanation of the related art, there has been proposed the slider support device including as members for detachably supporting a magnetic head slider, paired spring portions that are disposed on respective sides of the magnetic head slider in the suspension width direction and expand and contract independently from each other.

The thus configured conventional magnetic head slider locking apparatus can detachably mount the magnetic head slider to the magnetic head suspension by the elastic force of the paired spring portions. However, it has a problem that the magnetic head slider is likely to be displaced in the suspension width direction since the magnetic head slider is retained only by the elastic force along the suspension longitudinal direction generated by the paired spring portions.

On the other hand, the magnetic head slider locking apparatus 100 according to the present embodiment sandwiches the magnetic head slider 90 with respect to the suspension width direction with the elastic force generated by the paired arm portions 160 while sandwiching it with respect to the suspension longitudinal direction with the elastic force generated by the spring portion 130. Accordingly, the magnetic head slider locking apparatus 100 could realize a stabilized support of the magnetic head slider 90 in comparison with the conventional apparatus in which the magnetic head slider is retained only by the elastic force along the suspension longitudinal direction.

Furthermore, in the present embodiment, the paired arm portions 160 are elastically deformed from the close posture to the distant posture in response to the shift of the spring portion 130 from the initial posture to the elastically deformed posture, and are also elastically deformed from the distant posture to the sandwiching posture in response to the shift of spring portion 130 from the elastically deformed posture to the sandwiching posture.

Therefore, it is possible to stably support the magnetic head slider 90 by the elastic force in the suspension longitudinal direction and the elastic force in the suspension width direction, without worsening an efficiency of mounting and detaching work of the magnetic head slider 90 with use of the magnetic head slider locking apparatus 100.

Furthermore, in the magnetic head slider locking apparatus 100 according to the present embodiment, as shown in FIGS. 3 to 5 or the like, the spring portion 130 is formed into an endless shape so as to encircle the distal-side engage portion 120, the proximal-side engage portion 150 and the paired arm portions 160 in a plan view as viewed in a direction orthogonal to the disk surface.

The magnetic head slider locking apparatus 100 further includes a fixed portion 110 that is positioned within the spring portion 130 in the plan view as viewed in a direction along the orthogonal to the disk surface and is directly of indirectly fixed to the flexure substrate 400, a distal-side connection portion 140 that connects the fixed portion 110 to the spring portion 130, and a proximal-side connection portion 145 that connects the proximal-side engage portion 150 to the spring portion 130, wherein the distal-side engage portion 120 is directly or indirectly connected to the fixed portion 110.

As described above, in the present embodiment, the spring portion 130, which presses the proximal-side engage portion 150 toward the distal-side engage portion 120, has an endless shape. The present embodiment with the configuration exerts the following effects.

More specifically, in the conventional slider support device, each of the paired spring portions has the distal end serving as the fixed end, which is connected to the distal-end-side connection region to be engaged with the distal end of the magnetic head slider and the proximal end serving as the movable end, which is connected to the proximal-end-side connection region to be engaged with the proximal end of the magnetic head slider. The spring portions each expand and contract in the suspension longitudinal direction while being supported in a cantilever manner.

It is difficult to secure elastic forces strong enough to retain the magnetic head slider with use of elastic deformation of the paired sprang portions, while securing the expansion and contraction strokes of the paired spring portions that are each supported in a cantilever manner.

Accordingly, each of the paired spring portions in the conventional slider support device has the accordion shape in a plan view such that the convex portions and the concave portions are arranged alternately in the suspension longitudinal direction in the plane on which the flexure part is positioned. This configuration secures the elastic forces for retaining the magnetic head slider. However, high processing accuracy is required to form the accordion shape, which results in a remarkable increase in cost.

To the contrary, in the magnetic head slider locking apparatus 100 according to the present embodiment, as described above, the endless spring portion 130 disposed to surround the magnetic head slider 90 is elastically and deformed to cause an elastic force for sandwiching the magnetic head slider 90 along the suspension longitudinal direction.

The magnetic head slider locking apparatus 100 thus configured could secure the sufficient expansion and contraction stroke of the spring portion 130 so that the spring portion 130 is capable of causing a strong elastic force along the suspension longitudinal direction, without requiring high processing accuracy for formation of the spring portion 130. Accordingly, it is possible to achieve an elastic force that is strong enough to sandwich the magnetic head slider 90 along the longitudinal direction, while achieving a reduction in cost.

Moreover, in the conventional configuration, the convex portions and the concave portions are locally elastically deformed upon elastic deformation of the spring portions, which may cause another problem on durability.

To the contrary, in the present embodiment, the endless spring portion 130 is entirely elastically deformed to cause the elastic force along the suspension longitudinal direction for locking the magnetic head slider 90. Therefore, durability can be significantly improved in comparison to the conventional configuration provided with the spring portions each in the accordion shape.

Preferably, each of the paired arm portions 160 is provided at its proximal end region with a concave portion 161 that is opened to the inner side in the suspension width direction, as shown in FIGS. 3 to 5C.

The concave portion 161 makes it possible that each of the paired arm portions 160 is elastically deformed between the close posture and the distant posture without difficulty.

The fixed portion 110 can be modified into various configurations as far as being fixed to the flexure substrate 400.

Figure 6:
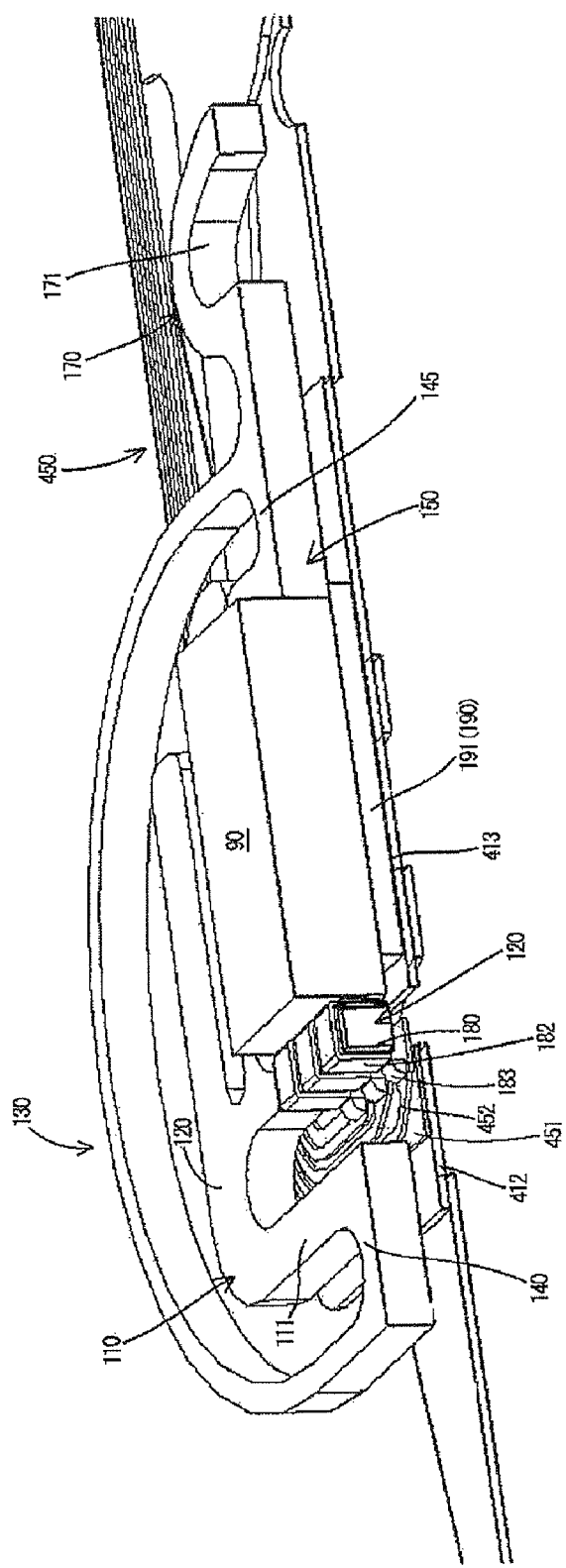
FIG. 6 is a cross sectional perspective view taken along line VI-VI of FIG. 3.
Figure 7:
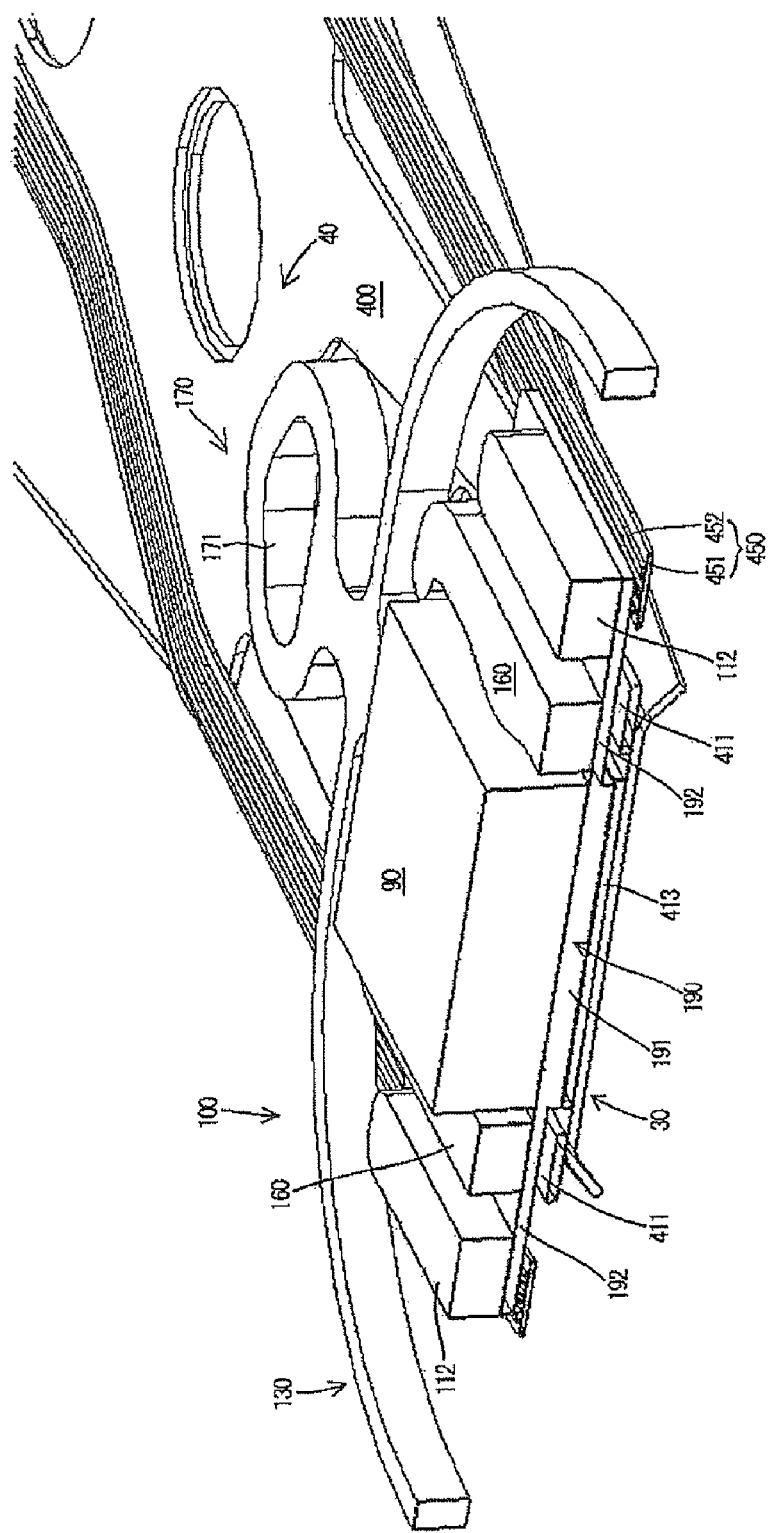
FIG. 7 is a cross sectional perspective view taken along line VII-VII of FIG. 3.

FIGS. 6 and 7 show perspective cross sectional views taken along lines VI-VI and VII-VII in FIG. 3, respectively.

In the present embodiment, as shown in FIGS. 2-7, the fixed portion 110 includes a width direction extending region 111 that extends in the suspension width direction so as to face the connection region 412 of the flexure substrate 400 and is connected to the spring portion 130 by way of the distal-side connection portion 140, and paired longitudinal direction extending region 112 that are positioned on outer sides of the paired arm portions in the suspension width direction and extend from both ends of the width direction extending region 111 in the suspension width direction toward the distal side in the suspension longitudinal direction.

As shown in FIGS. 2 and 3, there is provided a base plate 190 that is fixed to a side of the head mount region 413 facing the disk surface. The paired longitudinal direction extending regions 112 are fixed to a side of the base plate 190 facing the disk surface.

It is possible to stably mount the magnetic head slider locking apparatus 100 to the magnetic head suspension 1 by directly or indirectly fixing the paired longitudinal direction extending regions 112, which are provided on the outer sides of the paired arm portions 160 in the suspension width direction, to the flexure substrate 400 as described above.

As shown in FIGS. 2 and 7, the base plate 190 preferably includes a center region 191 fixed to the head mount region 413 and paired right and left side regions 192 extending from the center region 191 toward both sides of the suspension width direction. There is provided a step between the side regions 192 and the center region 191 so that there is provided a space in a direction orthogonal to the disk surface between the side regions 192 and the flexure substrate 400 in a state where the center region 191 is fixed to the head mount region 413.

In this case, the paired longitudinal direction extending regions 112 are fixed to sides of the paired side regions 192 facing the disk surface.

As described above, the step is provided on the surface of the base plate 190 that faces the flexure substrate 400 so that the surface of the side regions 192 that face the flexure substrate 400 are farther away from the flexure substrate 400 than that of the center region 191. The configuration makes it possible to fix the paired longitudinal direction extending regions 112, which are positioned on the outer sides of the paired arm portion 160 in the suspension width direction, to the base plate 190, while effectively preventing the paired arm regions 411 of the flexure substrate 400 from interfering with the base plate 190.

In place of or in addition to the fixing of the fixed portion 110 to the flexure substrate 400 by fixing the paired longitudinal direction extending regions 121 to the base plate 190 that is fixed to the head mount region 413, the fixed portion 110 could be fixed to the flexure substrate 400 by fixing the width direction extending region 111 to the connection region 412 of the flexure substrate 400.

In the present embodiment, as shown in FIGS. 3 and 4, the distal-side engage portion 120 extends in the suspension width direction in a state of being located closer to the proximal end in the suspension longitudinal direction than the width direction extending region 111 of the fixed portion 110 so as to allow a slit 115 to be provided between the distal-side engage portion 120 and the width direction extending region 111, and has both ends that are connected to the paired longitudinal direction extending region 112, respectively.

The paired arm portions 160 are connected to the distal-side engage portion 120 so as to sandwich the magnetic head slider 90.

That is, in the present embodiment, the paired arm portions 160 are connected to the fixed portion 110 through the distal-side engage portion 120.

The slit 115 serves as an insert hole for a fixed-side jig 210, which is arbitrarily used to elastically deform the spring portion 130 such that the proximal-side engage portion 150 is spaced apart from the distal-side engage portion 120.

Figure 8:
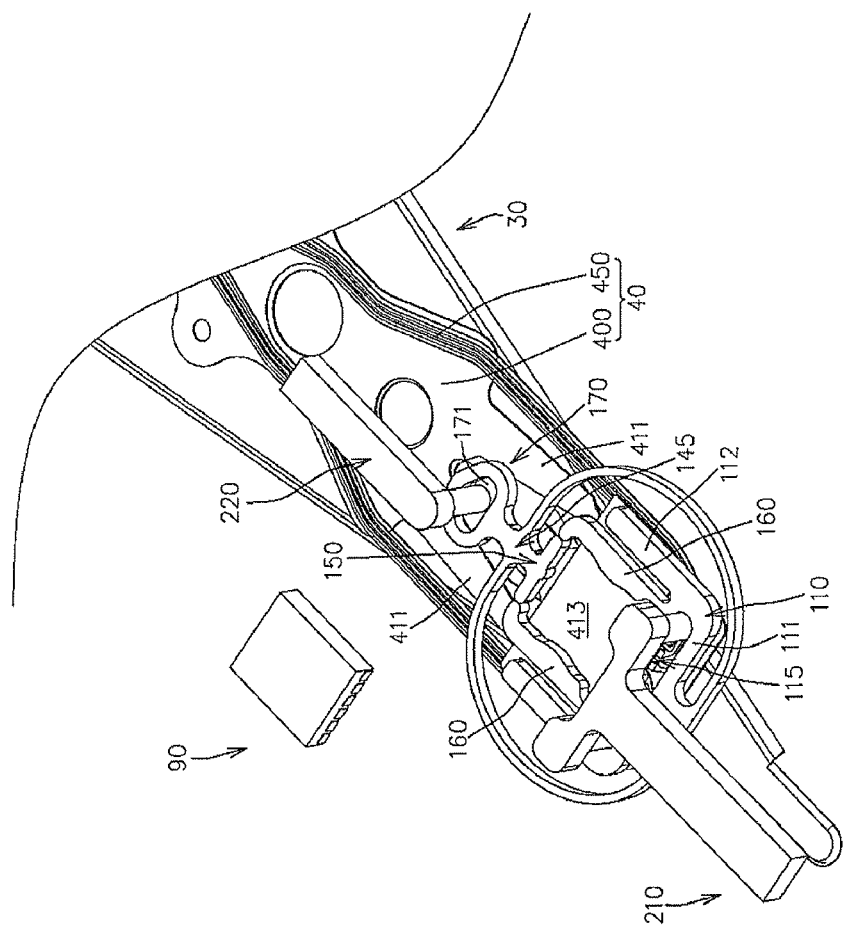
FIG. 8 is a perspective view showing a state where the magnetic head slider locking apparatus according to the first embodiment is elastically deformed.

More specifically, as shown in FIG. 8, by pulling the proximal end of the spring portion 130 toward the proximal side in the suspension longitudinal direction in the state where the fixed-side jig 210 is inserted into the slit 115, the spring portion 130 can be elastically deformed from the initial posture to the elastically deformed posture while effectively preventing an unnecessary stress from applying to the magnetic head suspension 1.

The magnetic head slider locking apparatus 100 is preferably provided with a movable-side jig insert hole 171 for allowing a movable-side jig 220 to be inserted therein, which is arbitrarily used for pulling the proximal side of the spring portion 130 so as to cause the proximal-side engage portion 150 to be spaced apart from the distal-side engage portion 120.

As shown in FIGS. 1 to 8, in the present embodiment, the magnetic head slider locking apparatus 100 has an extending arm 170 that is provided with the movable-side jig insert hole 171 and extends from the spring portion 130 toward the proximal side in the suspension longitudinal direction.

In the present embodiment, the description has been made by taking for example the case where the spring portion 130 is elastically deformed from the initial posture to the elastically deformed posture by pulling the proximal side of the spring portion 130 with the distal side thereof being fixed. Alternatively, the spring portion 130 can also be elastically deformed from the initial posture to the elastically deformed posture by compressing the spring portion 130 in the suspension width direction.

As shown in FIG. 3 or the like, the magnetic head slider locking apparatus 100 is configured so as to detachably mount the magnetic head slider 90 to the magnetic head suspension 1 and also electrically connect the magnetic head slider 90 to the wiring structure 450 of the flexure portion 40 when the magnetic head slider 90 is mounted to the magnetic head suspension 1.

As described above, the flexure portion 40 includes the flexure substrate 400 and the wiring structure 450.

As shown in FIGS. 6, 7 or the like, the wiring structure 450 includes an insulating layer 451 laminated on the flexure substrate 400, a conductive layer 452 laminated on the insulating layer 451, and a protecting layer (not shown) covering the conductive layer 452.

On the other hand, the magnetic head slider locking apparatus 100 has an electrical connection structure provided to distal-side engage portion 120.

As shown in FIGS. 4 and 6, the electrical connection structure includes an insulating layer 181 that wraps the distal-side engage portion, and a conductive member 182 that wraps the insulating layer 181. The conductive member 182 is electrically connected to the conductive layer 452 of the wiring portion 450 by way of a solder 183 or the like.

The configuration causes a terminal 91 (see FIG. 2) of the magnetic head slider 90 to be electrically connected to the conductive layer 452 by way of the conductive member 182 and the solder 183 when the magnetic head slider 90 is locked to the magnetic head suspension 1 by way of the magnetic head slider locking apparatus 100.

In the present embodiment, as shown in FIGS. 1 to 5C, the distal-side connection portion 140 connects the width direction extending region 111 of the fixed portion 110 to the inner peripheral surface of the spring portion 130 at the center in the suspension width direction, and the proximal-side connection portion 145 connects the center region 151 of the proximal-side engage portion 150 to the inner peripheral surface of the spring portion 130 at the center in the suspension width direction.

The configuration makes it possible to increase as much as possible the length of the region in which the spring portion 130 is elastically deformed upon transformation thereof from the initial posture into the elastically deformed posture. Therefore, it is possible to effectively prevent concentration of a stress onto a specific region of the spring portion 130 upon elastic deformation of the spring portion 130.

Further, as shown in FIGS. 1 to 3, in the present embodiment, the center region 151 of the proximal-side engage portion 150 has a curved shape that is convex toward the distal end in a plan view.

The configuration makes it possible to preferably maintain the engagement between the center region 151 of the proximal-side engage portion 150 and the magnetic head slider 90, even in a case where the magnetic head slider 90 is displaced with respect to the center region 151 of the proximal-side engage portion 150.

The endless spring portion 130 may be modified into various modes, as far as it is transformable between the initial posture and the elastically deformed posture.

As shown in FIGS. 1 to 8, in the present embodiment, the spring portion 130 in the initial posture has a substantially elliptical shape with the length in the suspension width direction being larger than the length in the suspension longitudinal direction, and the longitudinal length is increased while the width length is reduced as the spring portion 130 is transformed from the initial posture into the elastically deformed posture.

The configuration causes the spring portion 130 to be elastically deformed entirely and naturally upon transformation thereof between the initial posture and the elastically deformed posture. Therefore, it is possible to effectively prevent concentration of a stress onto a specific region of the spring portion 130 when the spring portion 130 takes the elastically deformed posture, whereby achieving improvement in durability of the spring portion 130.

As shown in FIGS. 3 to 5C, the substantially elliptical shape is preferably formed by a distal-side linear section 131, a proximal-side linear section 133, a first curved section 132a, and a second curved section 132b. The distal-side linear section 131 extends from a site to which the distal-side connection portion 140 is connected toward both sides in the suspension width direction. The proximal-side linear section 133 extends from a site to which the proximal-side engage portion 150 is connected toward both sides in the suspension width direction. The first curved section 132a connects first ends of the distal-side linear section 131 and the proximal-side linear section 133, and is formed into a convex shape toward the outer side in the suspension width direction in a plan view. The second curved section 132b connects second ends of the distal-side linear section 131 and the proximal-side linear section 133, and is formed into a convex shape toward the outer side in the suspension width direction in a plan view.

The configuration makes it possible to effectively prevent contact of the spring portion 130 to the fixed portion 110 when the spring portion 130 is elastically deformed, without increasing the size of the spring portion 130.

Figure 9A:
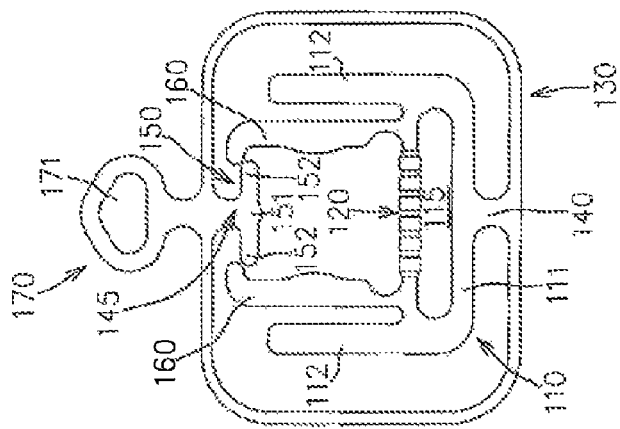
FIGS. 9A to 9C are bottom views of magnetic head suspensions according to modifications of the first embodiment.
Figure 9B:
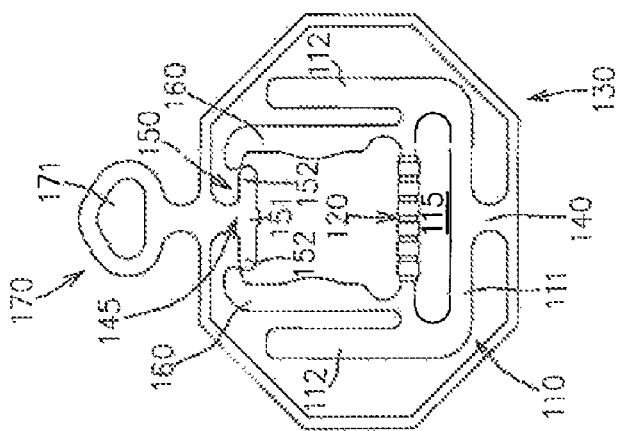
Figure 9C:
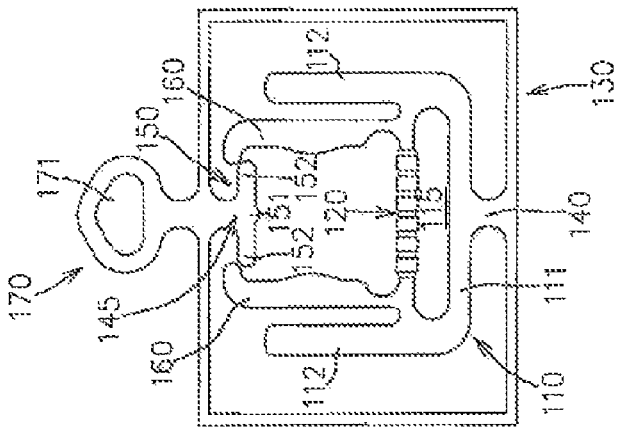

FIGS. 9A to 9C are bottom views (bottom plan views as viewed from the side close to the disk surface) of magnetic head slider locking apparatus according to modifications of the present invention.

In the drawings, the members that are the same as those in the magnetic head slider locking apparatus 100 according to the first embodiment are denoted by the same reference numerals.

As shown in FIGS. 9A and 9B, the spring portion 130 can be formed in a polygonal shape. Alternatively, as shown in FIG. 9C, the spring portion 130 can be formed in a polygonal shape with corners thereof being curved or chamfered.

Second Embodiment

Hereinafter, another embodiment of the magnetic head slider locking apparatus according to the present invention will be described, with reference to the attached drawings.

Figure 10:
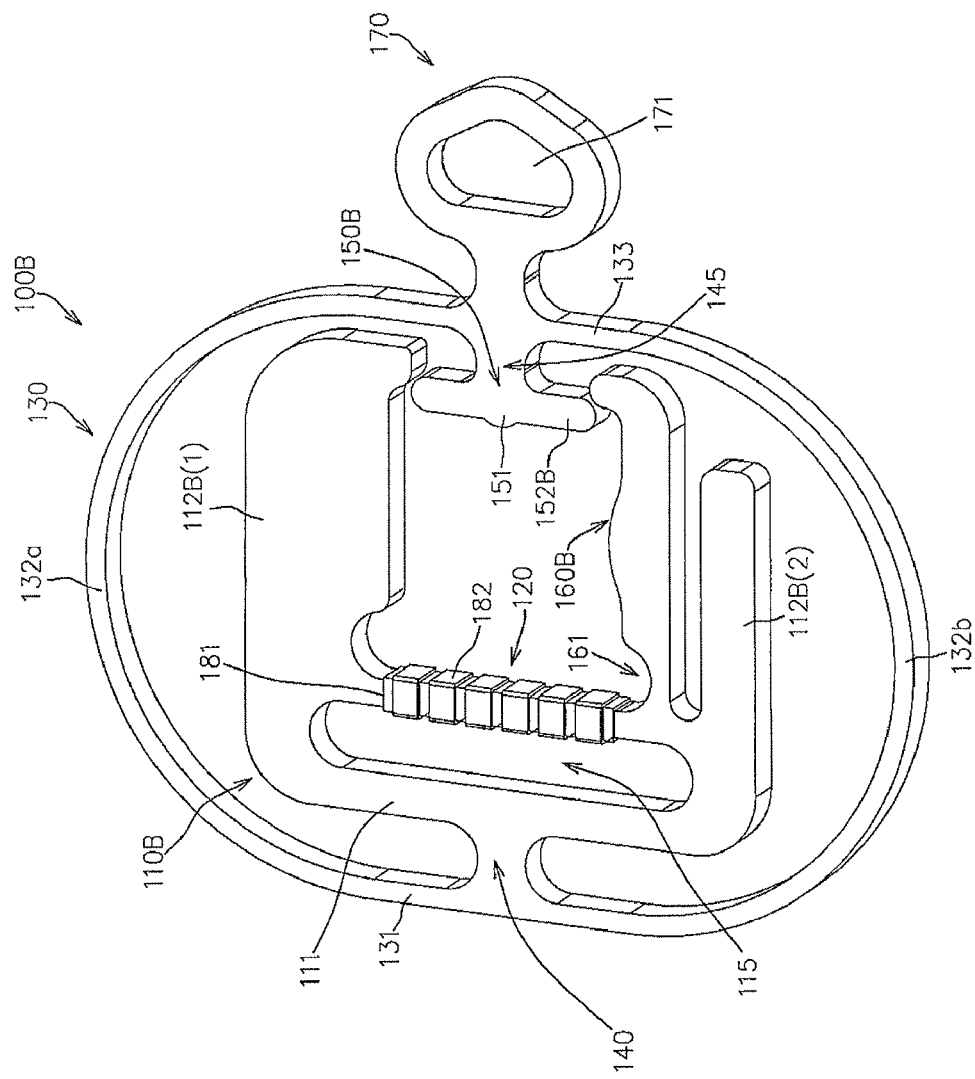
FIG. 10 is a perspective view of a magnetic head slider locking apparatus according to a second embodiment of the present invention.

FIG. 10 is a perspective view of a magnetic head slider locking apparatus 100B according to the present embodiment.

In the drawing, identical parts to those of the first embodiment have been given the same reference numerals to omit a detailed description thereof.

The magnetic head slider locking apparatus 100 according to the first embodiment is configured to sandwich the magnetic head slider 90 in the suspension longitudinal direction and also sandwich the magnetic head slider 90 in the suspension width direction by the paired right and left arm portions 160 capable of being elastically deformed in the suspension width direction.

The magnetic head slider locking apparatus 100B is same as the first embodiment with respect to a configuration for sandwiching the magnetic head slider 90 in the suspension longitudinal direction, but is different from the first embodiment with respect to a configuration for sandwiching the magnetic head slider 90 in the suspension width direction.

The magnetic head slider locking apparatus 100B according to the present embodiment is configured to fix a position of one side of the magnetic head slider 90 in the suspension width direction and sandwich the magnetic head slider 90 in the suspension width direction with using an elastic force of an arm portion 160B that is positioned on the other side of the magnetic head slider 90 and is capable of being elastically deformed.

More specifically, the magnetic head slider locking apparatus 100B includes a fixed portion 110B, the distal-side engage portion 120, an arm portion 160B, a spring portion 130, and a proximal-side engage portion 150B.

The fixed portion 110B has a first longitudinal direction extending region 112B(1) bringing into contact with the one side of the magnetic head slider 90, which has been directly or indirectly mounted on the head mount region 413, and is directly or indirectly fixed to the flexure substrate 400, as shown in FIG. 10.

The first longitudinal direction extending region 112B(1) brings into contact with the one side of the magnetic head slider 90, which has been directly or indirectly mounted on the head mount region 413, to prevent the magnetic head slider 90 from moving toward the one side in the suspension width direction.

In the present embodiment, as shown in FIG. 10, the fixed portion 110B further includes a width direction extending region 111 that extends in the suspension width direction. The first longitudinal direction extending region 112B(1) extends from one side of the width direction extending region 111 toward the distal side of the suspension longitudinal direction.

In the configuration, at least one of the width direction extending region 111 and the first longitudinal direction extending region 112B(1) is directly or indirectly fixed to the flexure substrate 400 so that the fixed portion 110B is fixed to the flexure substrate 400.

Furthermore, in the present embodiment, the fixed portion 110B includes a second longitudinal direction extending region 112B(2) that extends from the other side of the width direction extending region 111 toward the distal side of the suspension longitudinal direction.

In the configuration, as in the first embodiment, the base plate 190 may be fixed to the surface of the head mount region 413 that faces the disk surface, and the first and second longitudinal direction extending region 112B(1), 112B(2) may be fixed to the surface of the base plate 190 that faces the disk surface.

The arm portion 160B is directly or indirectly connected to the fixed portion 110B in a state capable of being elastically deformed in the suspension width direction, and sandwich the magnetic head slider 90 in the suspension width direction in cooperation with the first longitudinal direction extending region 112B(1), the magnetic head slider 90 being directly or indirectly mounted on the head mount region 413 in a state where the side surface thereof on the one side in the suspension width direction is brought into contact with the first longitudinal direction extending region 112B(1).

In the present embodiment, as shown in FIG. 10, the arm portion 160B is connected to the distal-side engage portion 120 so as to be positioned on an opposite side of the magnetic head slider 90 as the first longitudinal direction extending region 112B(1) with respect to the suspension width direction.

In the configuration, the second longitudinal direction extending region 112B(2) is positioned on the outer side of the arm portion 160B in the suspension width direction.

In the same way as the proximal-end engage portion 150, the proximal-side engage portion 150B is movable in the suspension longitudinal direction in a state capable of being engaged with the proximal end of the magnetic head slider 90 which has been directly or indirectly mounted on the head mount region 413, and is pressed toward the distal-side engage portion 120 by the spring portion 130.

Also in the magnetic head slider locking apparatus 100B according to the present embodiment, the spring portion 130 is formed into an endless shape.

More specifically, the spring portion 130 is disposed so as to surround the fixed portion 110B, the distal-side engage portion 120, the proximal-side engage portion 150B and the arm portion 160B in a plan view as viewed in a direction orthogonal to the disk surface.

The proximal-side engage portion 150B is connected to the spring portion 130 by way of the proximal-side connection portion 145.

More specifically, the proximal-side engage portion 150B includes the center region 151 connected to the spring portion 130 through the proximal-side connection portion 145, and a side region 152B extending from the center region 151 toward the arm portion 160B in the suspension width direction.

The center region 151 can be engaged with the proximal end of the magnetic head slider 90 that has been directly or indirectly mounted on the head mount region 413, and the side region 152B can be engaged with the arm portion 160B.

The arm portion 160B selectively takes a close posture, a distant posture or a sandwiching posture. When the spring portion 130 takes the initial posture, the arm portion 160B take the close posture in which a distance away from the first longitudinal direction extending region 112B(1) is narrower than the width of the magnetic head slider 90. When the spring portion 130 is shifted from the initial posture to the elastically deformed posture, the arm portions 160B is engaged with the side region 152B of the proximal-side engage portion 150B that is moved in accordance with the change of the posture of the spring portion 130 to take the distant posture in which the distance away the first longitudinal direction extending region 112B(1) is wider than the width of the magnetic head slider 90. When the spring portion 130 is shifted from the elastically deformed posture to the sandwiching posture, the arm portion 160B is disengaged from the side region 152B so as to take the sandwiching posture of sandwiching the magnetic head slider 90 in the suspension width direction in cooperation with the first longitudinal direction extending region 112B(1).

The thus configured magnetic head slider locking apparatus 100B can realize the same effects as the magnetic head slider locking apparatus 100 according to the first embodiment, and can enhance positioning accuracy of the magnetic head slider 90 with respect to the suspension width direction in comparison to the magnetic head slider locking apparatus 100 according to the first embodiment.

More specifically, in the magnetic head slider locking apparatus 100 according to the first embodiment, the paired arm portions 160 capable of being elastically deformed in the suspension width direction are provided on both sides of the magnetic head slider 90 in the suspension width direction. The magnetic head slider 90 is sandwiched by the paired arm portions 160 in the suspension width direction.

On the contrary to this, in the magnetic head slider locking apparatus 100B, the magnetic head slider 90 is retained in the suspension width direction by the elastic force of the arm portion 160B in a state where a position of one side of the magnetic head slider 90 in the suspension width direction is fixed by the first longitudinal direction extending region 112B(1).

Accordingly, the magnetic head slider locking apparatus 100B according to the present embodiment can enhance positioning accuracy of the magnetic head slider 90 with respect to the suspension width direction in comparison to the magnetic head slider locking apparatus 100 according to the first embodiment.

The invention claimed is:

1. A magnetic head slider locking apparatus for detachably mounting a magnetic head slider to a magnetic head suspension including a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part, the flexure part having a flexure substrate that integrally includes a load beam part overlap region fixed to the load beam part in a state of being overlapped therewith, paired arm regions extending toward a distal end side from both ends in a suspension width direction of the load beam part overlap region, a connection region extending in the suspension width direction so as to connect distal ends of the paired arm regions, and a head mount region which extends from the connection region toward a proximal end side in the suspension longitudinal direction so as to be positioned between the paired arm regions and to which the magnetic head slider is mounted, the magnetic head slider locking apparatus comprising, a distal-side engage portion that is fixed directly or indirectly to the flexure substrate so as to be engaged with a distal end of the magnetic head slider being mounted directly or indirectly on the head mount region, paired arm portions that are capable of being elastically deformed and are connected directly or indirectly to the distal-side engage portion so as to sandwich the magnetic head suspension, which has been mounted directly or indirectly on the head mount region, from both sides in the suspension width direction, a proximal-side engage portion that is movable in the suspension longitudinal direction in a state capable of engaged with a proximal end of the magnetic head slider being mounted directly or indirectly on the head mount region, and a spring portion that presses the proximal-side engage portion toward the distal-side engage portion, wherein the proximal-side engage portion includes a center region and paired side regions that extend from the center region toward both sides in the suspension width direction, the center region being capable of engaging with the proximal end of the magnetic head slider that has been mounted directly or indirectly on the head mount region, the paired side regions being capable of engaging with the paired arm portions, wherein the spring portion takes an initial posture of causing the center region of the proximal-side engage portion to be positioned closer to a distal side in the suspension longitudinal direction than the proximal end of the magnetic head slider, which has been mounted directly or indirectly on the head mount region in a state of being engaged with the distal-side engage portion, in a case of an operational force cancelled state in which no external operational force is applied to the spring portion, an elastically deformed posture of causing the center region to be positioned closer to a proximal side in the suspension longitudinal direction than the proximal end of the magnetic head suspension in a case of an operational force applied state in which an external operational force is applied to the spring portion, and a sandwiching posture of causing the center region to sandwich the magnetic head slider in cooperation with the distal-side engage portion in a case where the external operational force is released after the magnetic head slider has been mounted directly or indirectly on the head mount region while the spring portion being at the elastically deformed posture, and wherein the paired arm portions take a close posture in which a distance between inner surfaces thereof is narrower than a width of the magnetic head slider when the spring portion takes the initial posture, the paired arm portions are engaged with the paired side regions of the proximal-side engage portion that are moved in accordance with a posture change of the spring portion so as to take a distant posture in which the distance between inner surfaces of the paired arm portions is wider than the width of the magnetic head slider when the spring portion is shifted from the initial posture to the elastically deformed posture, and the paired arm portions are disengaged from the paired side regions so as to take a sandwiching posture that sandwiches the magnetic head slider from both sides in the suspension width direction when the spring portion is shifted from the elastically deformed posture to the sandwiching posture.

2. A magnetic head slider locking apparatus according to claim 1, wherein the spring portion is formed into an endless shape so as to surround the distal-side engage portion, the proximal-side engage portion and the paired arm portions in a plan view as viewed along a direction orthogonal to the disk surface, wherein the magnetic head slider locking apparatus further comprises a fixed portion that is positioned within the spring portion in a plan view as viewed along the direction orthogonal to the disk surface and is connected directly or indirectly to the flexure substrate, a distal-side connection portion that connects the fixed portion to the spring portion, and a proximal-side connection portion that connects the proximal-side engage portion to the spring portion, and wherein the distal-side engage portion is connected directly or indirectly to the fixed portion.

3. A magnetic head slider locking apparatus according to claim 2, wherein the fixed portion includes a width direction extending region that extends in the suspension width direction and paired longitudinal direction extending regions that are positioned on outer sides of the paired arm portions in the suspension width direction and extend from both ends of the width direction extending region in the suspension width direction toward the distal side in the suspension longitudinal direction, wherein there is provided a base plate fixed to a surface of the head mount region that faces the disk surface, wherein fixing of the fixed portion to the flexure substrate is achieved by fixing of the paired longitudinal direction extending region to the surface of the base plate that faces the disk surface.

4. A magnetic head slider locking apparatus according to claim 3, wherein the base plate includes a center region fixed to the head mount region and paired right and left side regions extending from the center region toward both sides of the suspension width direction, wherein there is provided a step between the side regions and the center region so that there is provided a space in a direction orthogonal to the disk surface between the side regions and the flexure substrate in a state where the center region is fixed to the head mount region, and wherein the paired longitudinal direction extending regions are fixed to surfaces of the paired side regions that face the disk surface.

5. A magnetic head slider locking apparatus according to claim 2,
wherein the distal-side connection portion connects the distal side of the fixed portion to the inner peripheral surface of the spring portion at the center in the suspension width direction, and
wherein the proximal-side connection portion connects the center region of the proximal-side engage portion to the inner peripheral surface of the spring portion at the center in the suspension width direction.

6. A magnetic head slider locking apparatus according to claim 5, wherein an engagement surface of the center region that is engaged with the magnetic head slider has a curved shape that is convex toward the distal side in the suspension longitudinal direction in a plan view.

7. A magnetic head slider locking apparatus according to claim 2, wherein the spring portion in the initial posture has a substantially elliptical shape with the length in the suspension width direction being larger than the length in the suspension longitudinal direction, and the longitudinal length is increased while the width length is reduced as the spring portion is transformed from the initial posture into the elastically deformed posture.

8. A magnetic head slider locking apparatus according to claim 7, wherein the substantially elliptical shape is formed by a distal-side linear section, a proximal-side linear section, a first curved section and a second curved section, the distal-side linear section extending from a site to which the distal-side connection portion is connected toward both sides in the suspension width direction, the proximal-side linear section extending from a site to which the proximal-side engage portion is connected toward both sides in the suspension width direction, the first curved section connecting first ends of the distal-side linear section and the proximal-side linear section and being formed into a convex shape toward the outer side in the suspension width direction in a plan view, the second curved section connecting second ends of the distal-side linear section and the proximal-side linear section and being formed into a convex shape toward the outer side in the suspension width direction in a plan view.

9. A magnetic head slider locking apparatus for detachably mounting a magnetic head slider to a magnetic head suspension including a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part, the flexure part having a flexure substrate that integrally includes a load beam part overlap region fixed to the load beam part in a state of being overlapped therewith, paired arm regions extending toward a distal end side from both ends in a suspension width direction of the load beam part overlap region, a connection region extending in the suspension width direction so as to connect distal ends of the paired arm regions, and a head mount region which extends from the connection region toward a proximal end side in the suspension longitudinal direction so as to be positioned between the paired arm regions and to which the magnetic head slider is mounted, the magnetic head slider locking apparatus comprising,
a fixed portion that is fixed directly or indirectly to the flexure substrate and has a first longitudinal direction extending region brought into contact with one side of the magnetic head slider, which has been directly or indirectly mounted on the head mount region; a distal-side engage portion that is fixed directly or indirectly to the flexure substrate so as to be engaged with the distal end of the magnetic head slider, which has been directly or indirectly mounted on the head mount region; an arm portion that is connected directly or indirectly to the fixed portion in a state capable of being elastically deformed in the suspension width direction and sandwiches the magnetic head slider in the suspension width direction in cooperation with the first longitudinal direction extending region, the magnetic head slider being directly or indirectly mounted on the head mount region in a state where the side surface thereof on the one side in the suspension width direction is brought into contact with the first longitudinal direction extending region; a proximal-side engage portion that is movable in the suspension longitudinal direction in a state capable of being engaged with the proximal end of the magnetic head slider that has been mounted directly or indirectly on the head mount region; and a spring portion that presses the proximal-side engage portion toward the distal-side engage portion,
wherein the proximal-side engage portion includes a center region and a side region extending from the center region toward the arm portion along the suspension width direction, the center region being engaged with the proximal end of the magnetic head slider that has been directly or indirectly mounted on the head mount region, the side region being engaged with the arm portion,
wherein the spring portion takes an initial posture of causing the center region of the proximal-side engage portion to be positioned closer to a distal side in the suspension longitudinal direction than the proximal end of the magnetic head slider, which has been mounted directly or indirectly on the head mount region in a state of being engaged with the distal-side engage portion, in a case of an operational force cancelled state in which no external operational force is applied to the spring portion, an elastically deformed posture of causing the center region to be positioned closer to a proximal side in the suspension longitudinal direction than the proximal end of the magnetic head suspension in a case of an operational force applied state in which an external operational force is applied to the spring portion, and a sandwiching posture of causing the center region to sandwich the magnetic head slider in cooperation with the distal-side engage portion in a case where the external operational force is released after the magnetic head slider has been mounted directly or indirectly on the head mount region while the spring portion being at the elastically deformed posture, and
wherein the arm portion takes a close posture in which a distance away from the first longitudinal direction extending region is narrower than the width of the magnetic head slider when the spring portion takes the initial posture, the arm portion is engaged with the side region of the proximal-side engage portion that is moved in accordance with a posture change of the spring portion so as to take a distant posture in which the distance away from the first longitudinal direction extending region is wider than the width of the magnetic head slider when the spring portion is shifted from the initial posture to the elastically deformed posture, and the arm portion is disengaged from the side region so as to take a sandwiching posture that sandwiches the magnetic head slider in the suspension width direction in cooperation with the first longitudinal direction extending region when the spring portion is shifted from the elastically deformed posture to the sandwiching posture.

10. A magnetic head slider locking apparatus according to claim 9,
wherein the fixed portion includes a width direction extending region that extends in the suspension width direction, the first longitudinal direction extending region extending from one side of the width direction extending region toward the distal side in the suspension longitudinal direction,
wherein the spring portion is formed into an endless shape that is disposed so as to surround the fixed portion, the distal-side engage portion, the proximal-side engage portion and the arm portion in a plan view as viewed along a direction orthogonal to the disk surface,
wherein the magnetic head slider locking apparatus further comprises a distal-side connection portion that connects the fixed portion to the spring portion, and a proximal-side connection portion that connects the proximal-side engage portion to the spring portion, and
wherein the distal-side engage portion is connected directly or indirectly to the fixed portion.

11. A magnetic head slider locking apparatus according to claim 10,
wherein the fixed portion further includes a second longitudinal direction extending region that is positioned on an outer side of the arm portion in the suspension width direction and extends from the other side of the width direction extending region toward the distal side in the suspension longitudinal direction,
wherein there is provided a base plate fixed to a surface of the head mount region that faces the disk surface, and
wherein fixing of the fixed portion to the flexure substrate is achieved by fixing of the first and second longitudinal direction extending regions to the surface of the base plate that faces the disk surface.

12. A magnetic head slider locking apparatus according to claim 10,
wherein the distal-side connection portion connects the distal side of the fixed portion to the inner peripheral surface of the spring portion at the center in the suspension width direction, and
wherein the proximal-side connection portion connects the center region of the proximal-side engage portion to the inner peripheral surface of the spring portion at the center in the suspension width direction.

13. A magnetic head slider locking apparatus according to claim 12, wherein an engagement surface of the center region that is engaged with the magnetic head slider has a curved shape that is convex toward the distal side in the suspension longitudinal direction in a plan view.

14. A magnetic head slider locking apparatus according to claim 10, wherein the spring portion in the initial posture has a substantially elliptical shape with the length in the suspension width direction being larger than the length in the suspension longitudinal direction, and the longitudinal length is increased while the width length is reduced as the spring portion is transformed from the initial posture into the elastically deformed posture.

15. A magnetic head slider locking apparatus according to claim 14, wherein the substantially elliptical shape is formed by a distal-side linear section, a proximal-side linear section, a first curved section and a second curved section, the distal-side linear section extending from a site to which the distal-side connection portion is connected toward both sides in the suspension width direction, the proximal-side linear section extending from a site to which the proximal-side engage portion is connected toward both sides in the suspension width direction, the first curved section connecting first ends of the distal-side linear section and the proximal-side linear section and being formed into a convex shape toward the outer side in the suspension width direction in a plan view, the second curved section connecting second ends of the distal-side linear section and the proximal-side linear section and being formed into a convex shape toward the outer side in the suspension width direction in a plan view.

* * * * *